US005374879A

United States Patent [19]
Pin et al.

[11] Patent Number: 5,374,879
[45] Date of Patent: Dec. 20, 1994

[54] OMNI-DIRECTIONAL AND HOLONOMIC ROLLING PLATFORM WITH DECOUPLED ROTATIONAL AND TRANSLATIONAL DEGREES OF FREEDOM

[75] Inventors: Francois G. Pin; Stephen M. Killough, both of Knoxville, Tenn.

[73] Assignee: Martin Marietta Energy Systems, Inc., Oak Ridge, Tenn.

[21] Appl. No.: 971,171

[22] Filed: Nov. 4, 1992

[51] Int. Cl.$^5$ .................... B60B 19/14; B62D 11/04; B62D 61/06
[52] U.S. Cl. ........................... 318/139; 318/8; 318/489; 180/210; 180/7.1; 180/21
[58] Field of Search ............ 318/568.11, 568.12, 318/580, 587, 618, 625, 640, 649, 8, 139, 489; 180/116, 117, 119, 7.1, 20, 21, 22, 23, 24.01, 24.03, 24.06, 24.07, 206, 65.1, 65.8, 210

[56] References Cited
U.S. PATENT DOCUMENTS

| | | |
|---|---|---|
| 3,912,037 | 10/1975 | Krieg . |
| 4,223,753 | 9/1980 | Bradbury . |
| 4,237,990 | 12/1980 | La . |
| 4,463,821 | 8/1984 | Falamak . |
| 4,715,460 | 12/1987 | Smith . |
| 4,733,737 | 3/1988 | Falamak . |
| 4,972,917 | 11/1990 | Matsumoto et al. . |
| 5,186,270 | 2/1993 | West . |

OTHER PUBLICATIONS

Popular Science, Jun. 1989, Easy Rollers, David Scott, p. 31.
Proceedings, 38th Conference on Remote Systems Technology, vol. 1, Dec. 1990, A fully Omnidirectional Wheeled Assembly for Robotic Vehicles, Stephen M. Killough and Francois G. Pin, pp. 93–96.
Naval Engineers Journal, Jan. 1991, Performance of an Omnidirectional Wheel on Snow and Ice, George L. Blaisdell, pp. 34–41.
Journal of Robotic Systems, 1987, Kinematic Modeling of Wheeled Mobile Robots, (accepted Nov. 25, 1986), Patrick F. Muir and Charles P. Neuman, pp. 281–340.

Primary Examiner—Bentsu Ro
Attorney, Agent, or Firm—Edward A. Pennington; James M. Spicer; Harold W. Adams

[57] ABSTRACT

A wheel assembly includes a support, a cage rotatably mounted on the support and having a longitudinal rotation axis, a first ball wheel rotatably mounted in the cage and having a rotation axis orthogonal to the rotation axis of the cage, and a second ball wheel rotatably mounted in the cage and having a rotation axis orthogonal to the rotation axis or the cage and to the rotation axis of the first ball wheel. A control circuit includes a photodetector signal which indicates ground contact for each ball wheel, and a tachometer which indicates actual drive shaft velocity.

23 Claims, 4 Drawing Sheets

OMNI-DIRECTIONAL AND HOLONOMIC ROLLING PLATFORM WITH DECOUPLED ROTATIONAL AND TRANSLATIONAL DEGREES OF FREEDOM This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to robotics and, more specifically, to a fully omni-directional and holonomic rolling platform, on which any of a variety of structures can be carried for various purposes, with decoupled rotational and translational degrees of freedom. Further, the invention relates specifically to the combination of a plurality of wheel assemblies used in the aforementioned platform and a control system for operating the drive motors of the wheel assemblies.

BACKGROUND OF THE INVENTION

A large number of wheeled or tracked platform mechanisms have been studied and developed to provide their mobility capability to teleooperated and autonomous robot vehicles. For large and heavy outdoor robots, four-wheel, car-like driving mechanisms or skid-steer platforms have traditionally been used. Because of kinematic constraints, these vehicles are restricted in their motion in the sense that they cannot move sideways (also known as "crab motion") without preliminary maneuvering. Better motion capabilities have been investigated in a variety of research centers and demonstrated on smaller laboratory robots. These improvements in motion capabilities typically are derived from the use of two independent driving wheels supplemented by casters, or by three steerable and coordinated driving wheels. The former type allows rotation of the platform around any point but does not allow sideways motion, while the later type realizes both rotation of the platform and sideways motion through coordinated steering of the wheels.

With the aforementioned three wheeled platform rotation and translation cannot occur simultaneously. Moreover, steering requires rotation of the wheels around a vertical axis which, for larger vehicles equipped with wide tires, may generate significant sliding and friction of the wheels.

Other structures of interest include the following: U.S. Pat. No. 3,912,037 to Krieg describes a transport vehicle having wheels that are pivotal for guidance. At least one vehicle carries an induction sensitive probe; U.S. Pat. No. 4,237,990 to La describes an omni-directional vehicle which has three individually driven wheels rotatable about horizontal axes, such that the wheels are arranged in a triangle; U.S. Pat. No. 4,463,821 to Falamak describes a steerable platform having wheels mounted on rotatable casters, and a control circuit which includes a transmitter, a receiver, steering sensors, and driving/steering clutches; U.S. Pat. No. 4,223,753 to Bradbury describes an omni-directional transport device in which driving wheels are disposed in pairs of side-by-side flat-sided spheres drivingly interconnected with the sides of one sphere turned 90° to the sides of the other; and U.S. Pat. No. 4,972,917 to Matsumoto et al. describes a carriage in which three wheels are driven and steerable to effect sideways and spin-turn motion.

None of the aforementioned devices succeed in fully decoupling the rotational and translational degrees of freedom while providing an omni-directional capability to the platform.

SUMMARY OF THE INVENTION

An object of the present invention is to provide an omni-directional and holonomic platform having decoupled rotational and translational degrees of freedom.

Another object of the present invention is to provide an omni-directional and holonomic platform which can be remote controlled, pre-programmed, or autonomously operated.

Still another object of the present invention is to provide an omni-directional and holonomic platform which has relatively low wheel wells, compared to other types of omni-directional wheeled structures, thus allowing motion under low obstacles.

These and other objects of the invention are met by providing an omni-directional and holonomic structure which includes a platform having a lower surface and an upper surface, a plurality of wheel assemblies, each including two spherical wheels having flat sides oriented 90° to the other, and a drive motor, and control means for controlling each drive motor in accordance with a desired translation vector and amount of platform rotation.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 1:
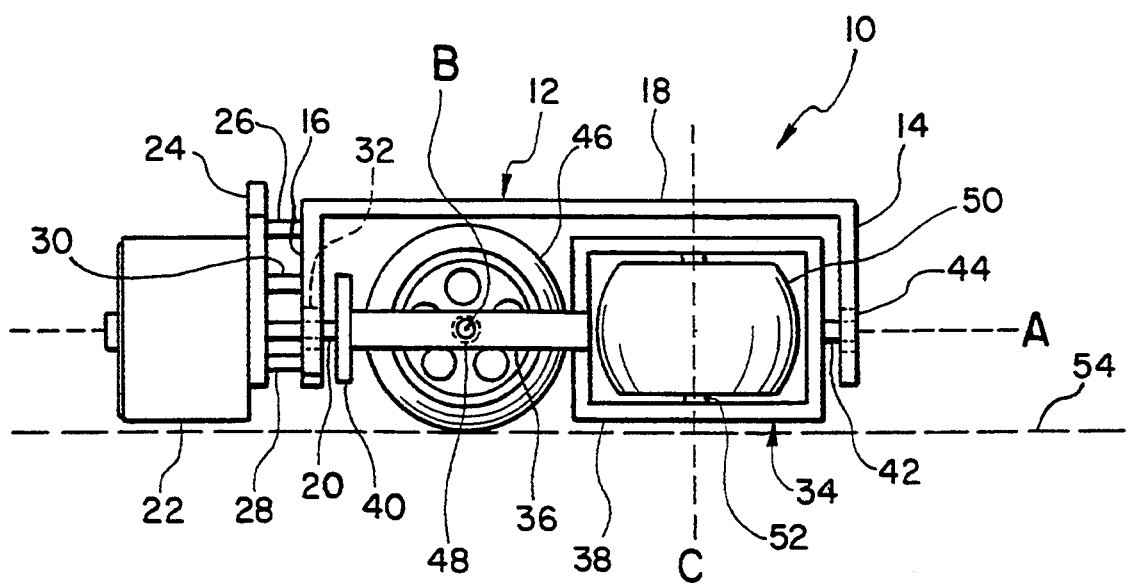
FIG. 1 is a side elevational view of a wheel assembly according to a preferred embodiment of the present invention.

Referring to FIG. 1, a wheel assembly 10 includes a frame 12 having parallel opposite end plates 14 and 16 extending radially outwardly from a base plate 18, and a drive shaft 20 journalled in the end plate 16 for rotation about a longitudinal rotation axis "A". The drive shaft 20 is coupled to drive motor 22, preferably a servo motor, which ks mounted on a mounting plate 24. The mounting plate 24 is fixedly connected to the end plate 16 through cylindrical spacers 26, 28, and 30. A ball bearing 32 is provided in the end plate 16 to facilitate rotation of the drive shaft 20.

The drive shaft 20 is connected to a cage 34 which includes first and second rectangular brackets 36 and 38. The first bracket 36 is fixedly connected to a drive plate 40, which in turn is fixedly connected to an end of the drive shaft 20. The second bracket 34 is provided with a stub shaft 42 which at one end is fixedly connected to the second bracket 34 and at the opposite end is journalled for rotation about the axis A in the end plate 14. A ball bearing 44 is provided in the end plate 14 to facilitate rotation.

A first ball wheel 46 is rotatably mounted in the first bracket 36 on a shaft 48 journalled between two opposite sides of the first rectangular bracket 36. Similarly, a second ball wheel 50 is mounted in the second bracket 34 on a shaft 52 journalled between two opposite sides of the second rectangular bracket 34. The rotation axis "B" of the ball wheel 46 is always 90° or orthogonal to the pivot axis "C" of the ball wheel 50.

Each ball wheel 46 and 50 has a spherical surface and two flat sides. Both have the same diameter. Ball bearing are used to mount the respective rotation shafts so that each wheel is free-wheeling within each respective bracket. As the shaft 20 rotates, there is always one spherical surface in contact with the ground 54. Due to the flat sides, a clearance is provided between the ground 54 and the bracket of whichever ball wheel is not in contact with the ground. One feature of the wheel assembly 10 is that the rotation axes B and C are mutually orthogonal, and orthogonal to the drive axis A. AS a result, when the drive shaft is rotated by the drive motor, contact with the ground is provided alternatively by one ball wheel or the other.

When the drive shaft rotates, the ball wheels 46 and 50 provide traction in the direction perpendicular to the axis A, while they are free-wheeling in the direction parallel to the axis A. In the direction perpendicular to the axis A, the entire assembly thus has a constrained motion which is controllable by rotation of the drive shaft 20 by the motor 22, while the motion component in the direction parallel to the axis A is unconstrained.

The above-described wheel assembly is particularly suitable for omni-directional platforms of the present invention, in which a plurality of wheel assemblies are mounted on a platform for carrying a variety of different instruments or devices. As long as the wheel assembly 10 is not required to rotate about a vertical axis, there is no need for a single contact point since both wheels turn at the same velocity and have identical trajectories on the ground. This is the case when building platforms with omni-directional translation capability only since an overlap of the rolling surfaces of the two ball wheels is feasible to provide a very smooth rolling behavior of the whole assembly.

If rotation of the platform around a vertical axis is required, then a single point of contact is necessary to prevent slippage of one of the wheels. This necessitates a control circuit which is capable of precisely timing the contact switch between the two longitudinally disposed ball wheels, and precisely controlling the shaft velocity of each corresponding drive shaft of each wheel assembly.

Figure 2:
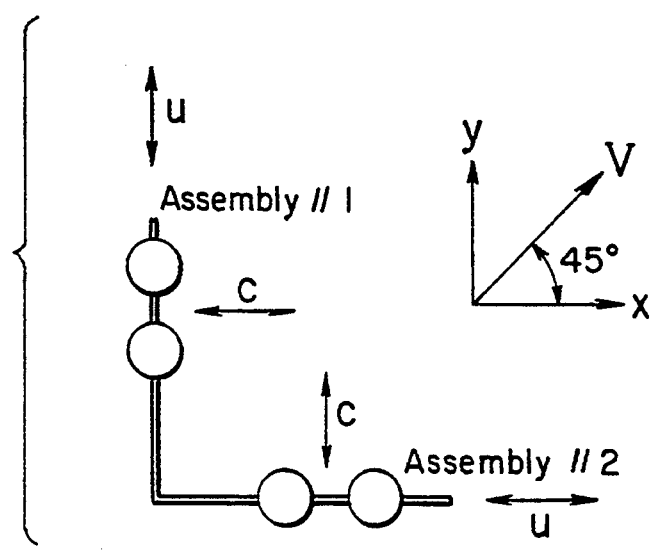
FIG. 2 is a schematic view showing constrained and unconstrained directions of motion of an rolling platform assembly employing two wheel assemblies of the present invention.

When placing two or more wheel assemblies under a given platform, their respective motion in constrained directions can be combined to produce a motion of the platform in any desired direction, while each assembly freewheels in its unconstrained direction. Referring to FIG. 2, two wheel assemblies are shown schematically attached to the underside of a chassis. The constrained and unconstrained directions of each assembly are designated by the letters "c" and "u", respectively. If the platform needs to move in the x direction with the linear velocity Vx, then the motor of assembly 1 needs to turn clockwise at a velocity $w = Vx/2\pi R$, R being the radius of the ball wheels, while the motor of assembly 2 is not turning so that assembly 2 is only free-wheeling during the motion. If the platform motion needed to be at a velocity V oriented at 45° from the x direction, then the motor of assembly 1 would need to turn at the velocity $\omega = (V/2\pi R)/\sqrt{2}$ (clockwise), while both assemblies would be free-wheeling at velocity $V/\sqrt{2}$ in their respective unconstrained directions. Thus, by appropriately positioning several assemblies under a platform, it is possible to drive and control the platform in any direction while ensuring both load and directional stability. As will be shown below, the platform can also be given a rotational capability which can be controlled independently of the translational capability.

According to the present invention, a variety of different configurations of wheel assemblies and platforms can be used to provide omni-directional translation and, if desired, simultaneous rotation of the platform. The basic requirement is that the layout selected must provide enough directions of constrained motions of the assemblies to allow both omni-directional translation and rotation of the platform, and that stability of the platform be maintained independently of the internal configuration of the assemblies, i.e., which wheel in the assembly makes ground contact.

Figure 3:
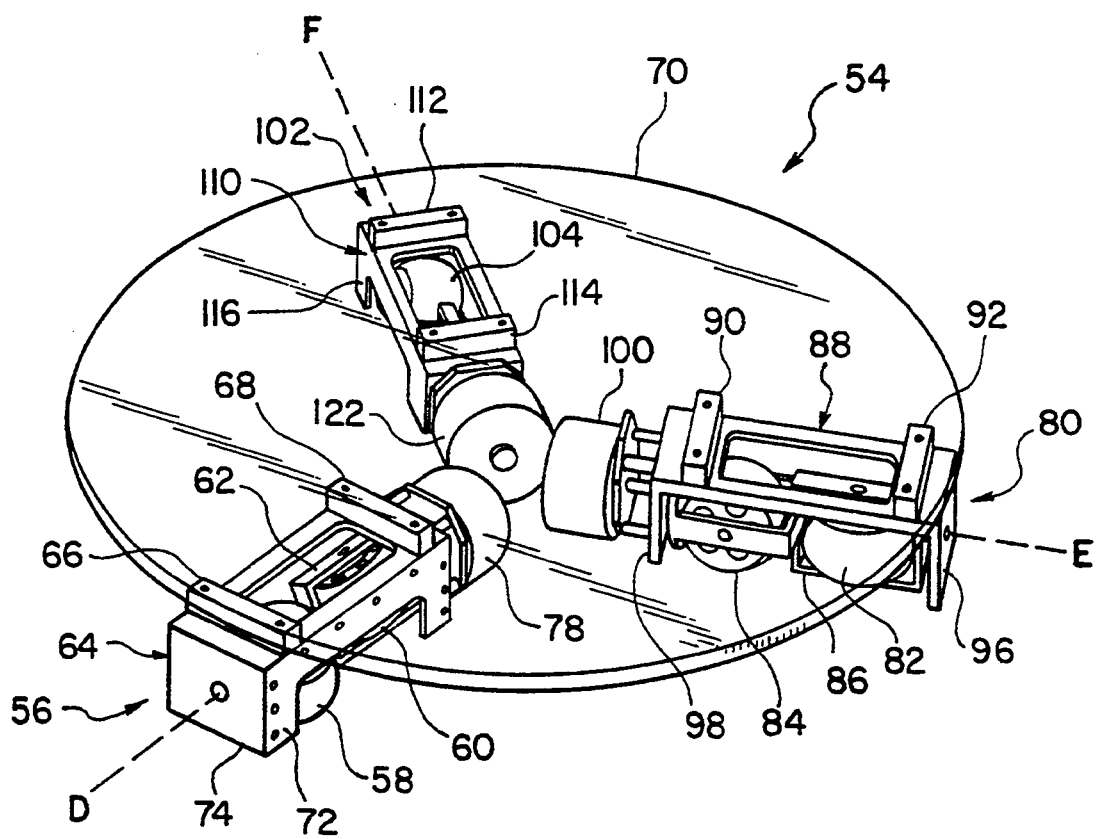
FIG. 3 is a top perspective view of a rolling platform assembly of the present invention.
Figure 4:
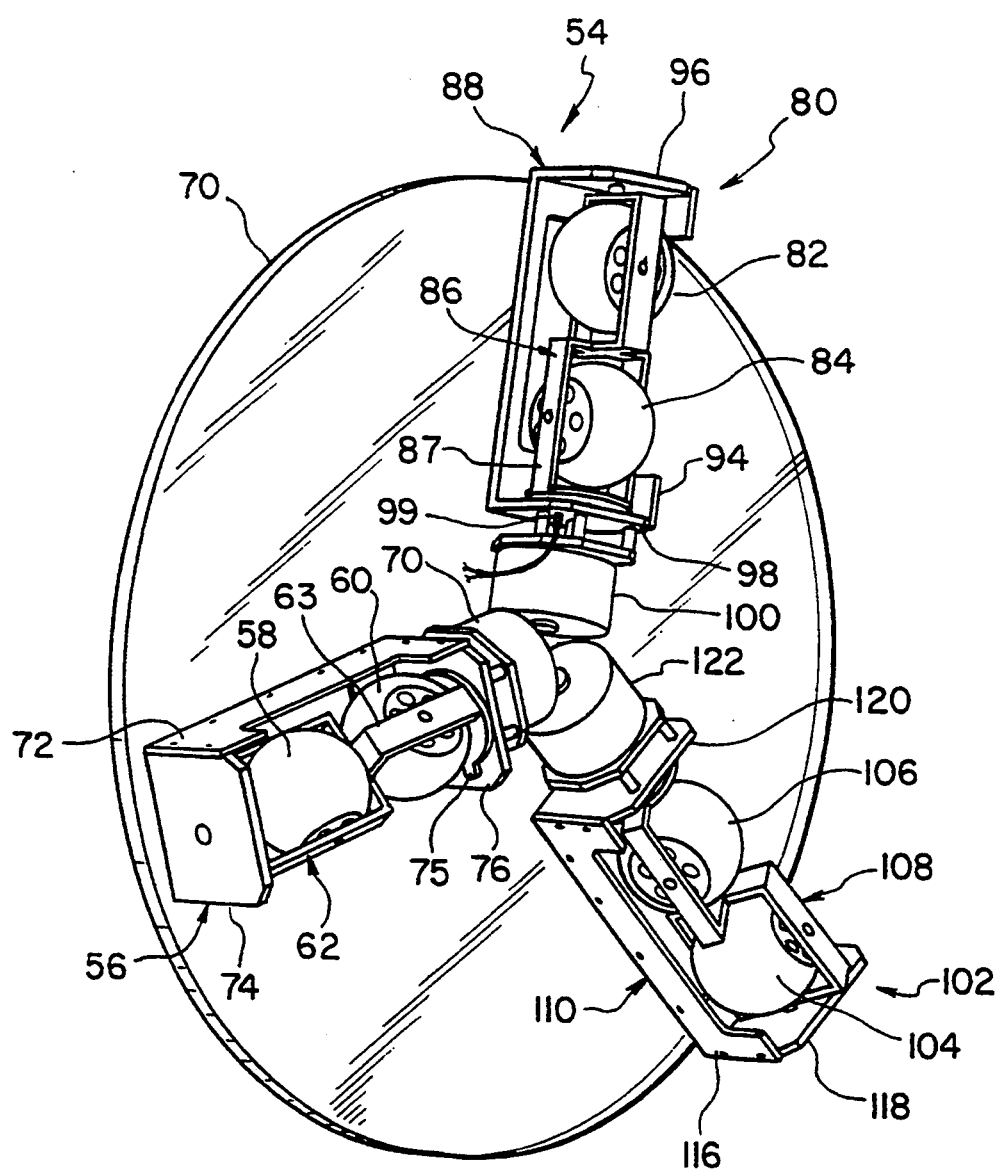
FIG. 4 is a bottom perspective view of a rolling platform assembly of the present invention.

A representative embodiment of a rolling platform 54 employing a plurality of wheel assemblies is shown in FIGS. 3 and 4. A first wheel assembly 56 includes two orthogonal ball wheels 58 and 60 rotatably mounted in a cage 62 which is rotatably mounted in a frame 64 to thus rotate about an axis "D". In all respects, the wheel assembly is the same as the one illustrated in FIG. 1, except that a pair of mounting blocks 66 and 68 are included to mount the assembly 64 on the under side of a plexiglass disk 70. Also, a brace plate 72 is provided on at least one side of the frame between the two end plates 74 and 76 to strengthen the frame 64. An electric motor 78 is coupled to the cage 62 to impart a controlled rotational force thereto. As seen in FIG. 4, an opening 75 is provided in the end plate 76 and receives a photodetector or similar sensor for determining the position of the cage 62. Position is determined by a light beam striking the side bars of the rectangular bracket 63 as it passes the opening 75. The photodetector provides data to a computer to track ground contact of the wheels.

A second wheel assembly 80 includes two orthogonal ball wheels 82 and 84 rotatably mounted in a cage 86 which is rotatably mounted in a frame 88 to thus rotate about an axis "E". In all respects, the wheel assembly 80 is the same as the one illustrated in FIG. 1, except that a pair of mounting blocks 90 and 92 are included to mount the assembly 80 on the under side of the plexiglass disk 70. Also, a brace plate 94 is provided on at least one side of the frame 88 between the two end plates 96 and 98 to strengthen the frame 88. An electric motor 100 is coupled to the cage 86 to impart a controlled rotational force thereto. An opening (not seen) is provided in the end plate 98 and receives a photodetector 99 or similar sensor for determining the position of the cage 86. Position is determined by a light beam striking the side bars of the rectangular bracket 87 as it passes the opening. The photodetector 99 provides data to the computer to track ground contact of the wheels 82 and 84.

A third wheel assembly 102 includes two orthogonal ball wheels 104 and 106 rotatably mounted in a cage 108 which is rotatably mounted in a frame 110 to thus rotate about an axis "F". As with the assemblies 56 and 80, the wheel assembly 102 is the same as the one illustrated in FIG. 1, except that a pair of mounting blocks 112 and 114 are included to mount the assembly 102 on the under side of the plexiglass disk 70. Also, a brace plate 116 is provided on at least one side of the frame 110 between the two end plates 118 and 120 to strengthen the frame 110. An electric motor 122 is coupled to the cage 108 to impart a controlled rotational force thereto. A photosensor (not shown) is provided as for the other wheel assemblies.

The embodiment of FIGS. 3 and 4 represents one of the most simple layouts of the rolling platform of the present invention. With the three wheel assemblies 56, 80, and 102 oriented at 120° from each other, the platform 54 stability is extremely easy to ensure. In addition, the $2\pi/3$ orientation relationship between the constrained motion directions provides excellent directional stability. Without the benefit of a suspension system, a layout with four perpendicular assemblies would not provide added load stability and in some cases would invalidate the assurance of directional stability because of the possibility for non-contact of one of the wheels on uneven ground.

Not illustrated in FIGS. 3 and 4, for 0 simplicity, are power hook-up cables for providing electric power to the electric motors 78, 100 and 122, as well as the computer hardware for effecting control of the motors in a manner to be described below. The upper surface of the disk can be used to support any of a variety of ambulatory mechanisms which require a rolling platform. Examples include instrumentation, automated vacuum cleaners, mobile robots, materials transport devices for use in factories, hospitals, etc.

Figure 5:
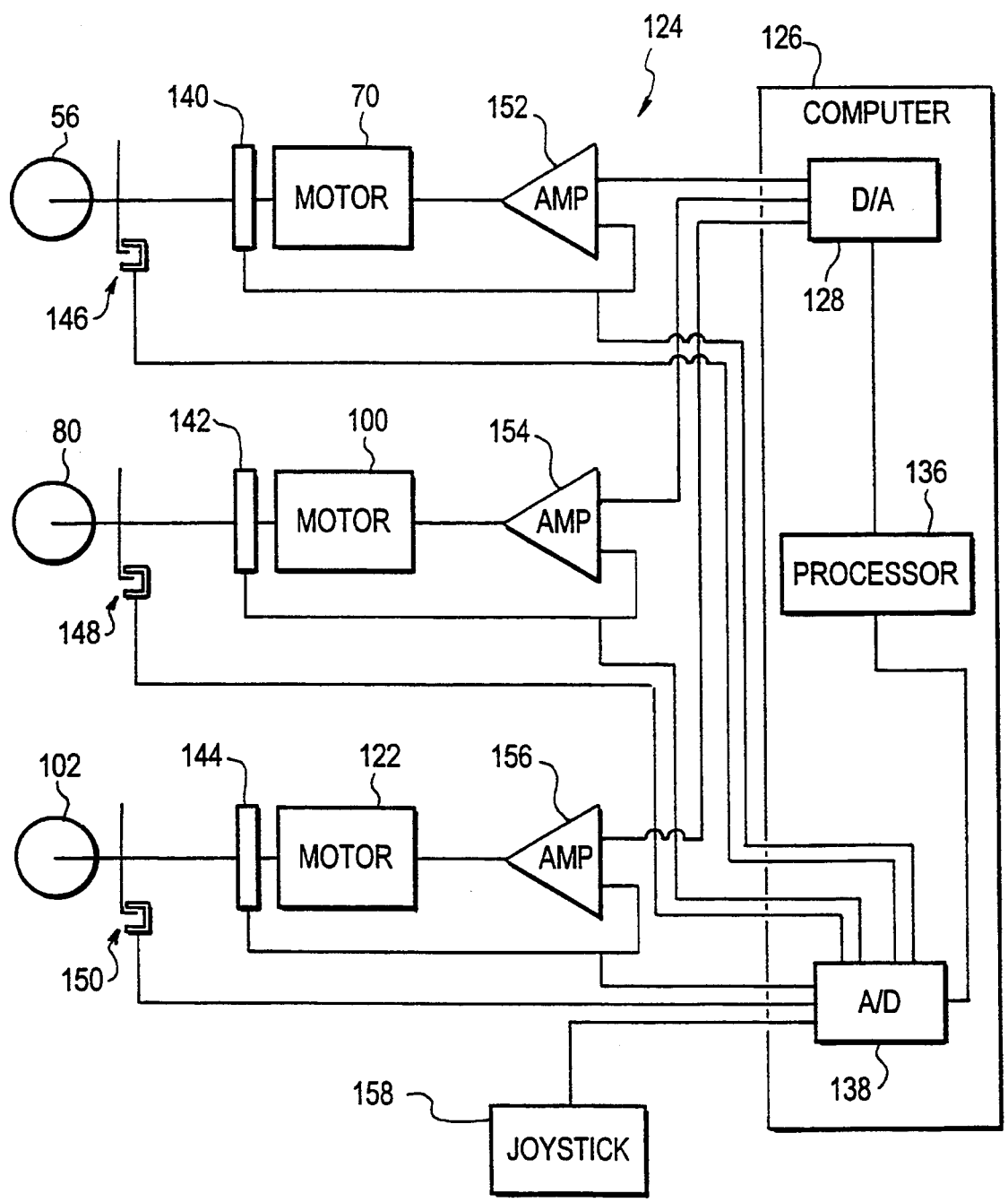
FIG. 5 is a schematic diagram of a control system for he rolling platform of the present invention.

Referring to FIG. 5, a control system 124 of the present invention includes a seven slot VME bus-based computer 126 with six slots occupied by a 68020 CPU, floppy controller, hard disk controller, serial ports, a digital-to-analog (D/A) card 128 and analog-to-digital (A/D) card 138. For simplicity, a processor 136 provides the necessary computations as described below. The electric motors 70, 100, and 122 of the wheel assemblies 56, 80, and 102 receive desired shaft velocity control signals from the computer 126. Tachometers 140, 142, and 144 are respectively coupled to the output drive shafts of the motors 70, 100, and 122 to provide respective motor feed back loops with the desired shaft velocity control signals via respective amplifiers 152, 154, and 156.

The tachometer signals are also fed back to the computer 126 as part of a platform velocity feed back loop, which includes signals from respective photosensors 146,148, and 150. These are used to track ground contact of the wheels of the wheel assemblies 56, 80, and 102. The photosensors can also function as crude encoders during large-scale motion by counting the wheel rotations. The platform velocity feedback loop performs dead reckoning based on odometry. The command signals to the velocity control loops are provided at, for example, 100 Hz by the computer which receives input either from a joystick 158 for operation in teleoperated mode, or from the path planning and tracking modules in an autonomous mode. In the later, sensors (not shown) could be mounted on the disk at the periphery thereof to provide indications of proximity/position relative to obstacles and/or objects within a room.

Figure 6:
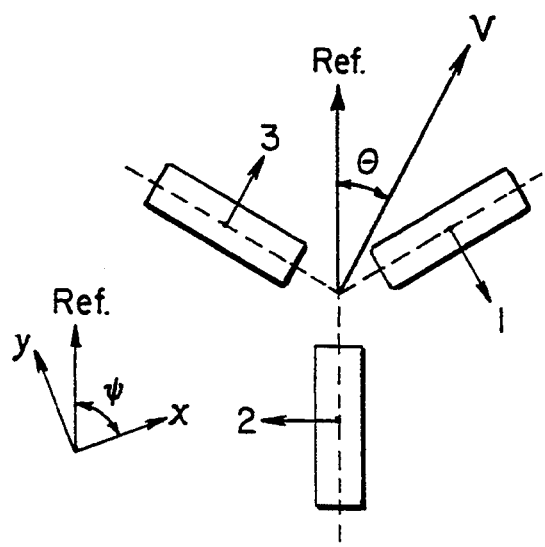
FIG. 6 is a schematic view of a rolling platform of the present invention using three wheel assemblies.

FIG. 6 shows the layout of the three orthogonal ball wheel assemblies 56, 80, and 102. The constrained directions of motion of each assembly are indicated by the arrows labeled 1, 2, and 3. The Greek letter $\Psi$ denotes the angular velocity of the internal reference frame of the platform with respect to an absolute reference frame (x,y). The magnitude of the platform translational velocity is denoted by $|V|$ and its direction with respect to the platform internal reference frame is denoted by $\Theta$. With these conventions, the driving shaft velocities, $\omega i$, can be calculated as:

$$\omega 1 = |V|/2R (\sin \Theta - \sqrt{3} \cos \Theta) + \psi L1/R \quad (1)$$

$$\omega 2 = -|V|/R \sin \Theta + \psi L2/R \quad (2)$$

$$\omega 3 = |V|/2R (\sin \Theta + \sqrt{3} \cos \Theta) + \psi L3/R \quad (3)$$

where R is the radius of the ball wheels and Li represents the distance between the center of the platform or disk and the center of the wheel of the assembly "i" currently contacting the ground. The first terms on the right-hand side of equations (1) and (3) represent the projections of the translational velocity V on the constrained motion directions of each assembly, while the last terms represent the components due to the rotational velocity of the platform. It is evident from the relations that the rotational and translational motions are fully decoupled and can be controlled independently and simultaneously. It is also clear from the above that, although much simpler to implement for creating an omni-directional capability in translation, the use of the "longitudinal" wheel assemblies of FIG. 1 presents a challenge for the rotational capability of the platform since the control system has to approximate the step function in $\omega i$ due to the abrupt change in the values of Li when contact switches from one wheel to the other. For fast rotating platforms, "lateral" assembly of ball wheels would resolve this problem.

In the teleoperated mode, the signals from the joystick 158 directly provide the values of $\omega$, $|V|\sin \Theta$, and $|V|\cos \Theta$. The control system calculates the three shaft velocities from equations (1), (2), and (3) and servos on these at 100 Hz using the tachometer data. In the autonomous mode, the input to the control system are either "target configurations" (x,y,$\Psi$) which are provided by the user in a list of "via points" forming a trajectory, or "target speeds" ($|V|,\Theta, \Psi$) calculated by the reasoning systems at sensor sampling rate during sensor-based navigation. The system could include inferencing modules for obstacle avoidance and decision-making in sensor-based navigation, which for example could use a ring of twenty four acoustic range sensors disposed on the periphery of the disk and a custom-designed VLSI fuzzy logic inferencing board.

In the user provided trajectory following mode, the target configuration is compared to the current estimate of position and orientation calculated by the dead reckoning. The results provide the direction of motion and the platform target rotational and translational speeds using linear ramp up profiles, up to the pre-set maximum velocities. The corresponding shaft velocities $\omega i est$ are calculated from equations (1)–(3) and are used to check that the maximum allowed shaft velocity is not exceeded. If this is the case, all velocities (the system in equations (1)–(3) is linear) are decreased by the ratio $\omega i est/\omega i max$ prior to being fed to the servo controls.

Similarly, when the platform comes within a radius rslow from its target location or within an angle Ψslow from its target orientation, the calculated translational velocity |V| or the rotational velocity Ψ are decreased using linear ramp down profiles. When the location and rotational angle are both within given thresholds, rnew and Ψnew, from their target values, a new entry is read from the list and become the target configuration, or the platform stops if the list is exhausted.

At each loop cycle (of length Δt), the dead reckoning system integrates the rotational and translational velocities to estimate the current orientation and position of the platform. Estimates of the platform motion parameters can be easily calculated from equations (1)–(3) with the values of the shaft velocities $\omega^*i$ fedback during the loop cycle and the distance Li obtained from the photosensors data:

$$\frac{\Delta \psi}{\Delta t} \approx \psi = \frac{R(\omega^*_1 + \omega^*_2 + \omega^*_3)}{L_1 + L_2 + L_3} \quad (4)$$

$$|V| \sin \Theta = R \left[ \frac{(\omega^*_1 + \omega^*_3)L_2 - \omega^*_2(L_1 + L_3)}{(L_1 + L_2 + L_3)} \right]$$

$$|V| \cos \Theta =$$

$$\frac{R}{\sqrt{3}} \left[ \frac{-\omega^*_1(2L_3 + L_2) + \omega^*_2(L_1 - L_3) + \omega^*_3(2L_1 + L_2)}{L_1 + L_2 + L_3} \right]$$

If both right-hand sides (RHS) of equations (5) and (6) are zero, then |V| = 0 and Θ is kept at its value from the previous loop cycle. If only the RHS of equation (5) is zero, then Θ=0 or Θ =π depending on whether the sign of the RHS of equation (6) is positive or negative, respectively; and |V| is given by equation (6). Similarly, if only the RHS of equation (6) is zero, then Θ= ±π/2 with the sign given by the sign of the RHS of equation (5), and |V| is given by equation 5.

If neither RHS's are zero, then $$\Theta = \text{Arctan} \sqrt{3} \left[ \frac{L_2(w^*_3 + w_1)^* - w_2^*(L_3 + L_1)}{-w_1^*(2L_3 + L_2) + w_2^*(L_1 - L_3) + w_3^*(2L_1 + L_2)} \right], \text{module } \pi. \quad (7)$$

with Θ determined by the sign of the RHS of equation (5), and |V| given by equation (5) or (6).

Accordingly, the very important characteristic of mobile platforms based on orthogonal ball wheels assemblies as described above is their overall holonomy: no constraints exist on the platform velocity direction. Coupled with the omni-directional capability, this gives full dimension to the space of achievable configurations and velocities, a characteristic not achieved with any of the conventional wheeled platforms. This feature is particularly suitable for the design of large, possibly odd-shaped robotic platforms or vehicles. The basic platforms described above are omni-directional, holonomic, fully controllable, and statically stable. Proper coordinated control of several of these low profile (small wheel well) "casters" underneath a large platform would provide full holonomy and omni-directionality to that platform.

While advantageous embodiments have been chosen to illustrate the invention, it will be understood by those skilled in the art that various changes and modifications can be made therein without departing from the scope of the invention as defined in the appended claims.

What is claimed is:

1. An apparatus for controlling a rolling platform having at least three wheel assemblies, each wheel assembly including a pair of ball wheels driven by a drive shaft of a corresponding drive motor, the apparatus comprising:
   means for inputting a command signal indicative of a desired platform direction and velocity of translation and angular velocity of rotation necessary to achieve a desired platform position and orientation following operation of the drive motors for a given period of time;
   means for determining desired shaft velocities for the at least three drive motor shafts necessary to impart the inputted desired platform direction and velocity of translation and angular velocity of rotation;
   first sensing means for sensing actual shaft velocity of the three drive motors;
   second sensing means for sensing ground contact for the pair of ball wheels for each wheel assembly;
   means, coupled to the first and second sensing means, for calculating actual platform position and orientation after a given time of operation of the drive motors;
   means for comparing the desired platform position and orientation to the actual platform position and orientation; and
   means for altering the command signal to achieve coincidence between the desired position and orientation of the platform and the actual position and orientation of the platform.

2. An apparatus according to claim 1, wherein each wheel assembly includes a support, a cage rotatably mounted on the support and having a longitudinal rotation axis, a first ball wheel rotatably mounted in the cage and having a rotation axis orthogonal to the rotation axis of the cage, and a second ball wheel rotatably mounted in the cage and having a rotation axis orthogonal to the rotation axis or the cage and to the rotation axis of the first ball wheel.

3. An apparatus according to claim 2, wherein the support includes a frame having first and second parallel opposite end plates extending radially outwardly from a base plate, and a drive shaft journalled in the first and second end plates for rotation about the longitudinal rotation axis of the cage.

4. An apparatus according to claim 2, further comprising drive motor means mounted on the support for rotating the cage and thus the first and second ball wheels about the longitudinal axis of the cage.

5. An apparatus according to claim 3, wherein the cage includes first and second interconnected rectangular brackets mounted on the drive shaft, and being oriented orthogonally with respect to each other.

6. An apparatus according to claim 3, wherein each ball wheel has a spherical surface and two flat sides, whereby as the drive shaft rotates, one spherical surface of either the first and second ball wheels is always in contact with the ground.

7. An apparatus according to claim 1, wherein the determining means includes means for computing the driving shaft velocities for each respective drive motor according to the following equations:

$$\omega 1 = |V|/2R (\sin \Theta - \sqrt{3} \cos \Theta) + \psi L1/R \quad (1)$$

$$\omega 2 = -|V|/R \sin \Theta + \psi L2/R \quad (2)$$

$$\omega 3 = |V|/2R (\sin \Theta + \sqrt{3} \cos \Theta) + \psi L3/R \quad (3)$$

where R is the radius of the ball wheels and Li represents the distance between the center of the platform and the center of the wheel of the assembly "i" currently contacting the ground, $\Psi$ denotes the angular velocity of an internal reference frame of the platform with respect to an absolute reference from (x,y), the magnitude of the platform translational velocity is denoted by $|V|$ and its direction with respect to the platform internal reference frame is denoted by $\Theta$.

8. An apparatus according to claim 7, wherein the calculating means comprises means for integrating the rotational and translational velocities with the values of the shaft velocities fed back during a loop cycle according to the following formula:

$$\frac{\Delta \psi}{\Delta t} \approx \psi = \frac{R(\omega^*_1 + \omega^*_2 + \omega^*_3)}{L_1 + L_2 + L_3} \quad (4)$$

$$|V|\sin \Theta = R \left[ \frac{(\omega^*_1 + \omega^*_3)L_2 - \omega^*_2(L_1 + L_3)}{(L_1 + L_2 + L_3)} \right] \quad (5)$$

$$|V|\cos \Theta = \quad (6)$$

$$\frac{R}{\sqrt{3}} \left[ \frac{-\omega^*_1(2L_3 + L_2) + \omega^*_2(L_1 - L_3) + \omega^*_3(2L_1 + L_2)}{L_1 + L_2 + L_3} \right]$$

wherein if both right-hand-sides of equations (5) and (6) are zero, then $|V|=0$ and $\Theta$ is kept at its value from the previous loop cycle.

9. An apparatus according to claim 8, wherein the calculating means determines that if both right-hand sides (RHS) of equations (5) and (6) are zero, then $|V|=0$ and $\Theta$ is kept at its value from the previous loop cycle, and if only the RHS of equation (5) is zero, then $\Theta=0$ or $\Theta=\pi$ depending on whether the sign of the RHS of equation (6) is positive or negative, respectively, and $|V|$ is given by equation (6), and if only the RHS of equation (6) is zero, then $\Theta=\pm\pi/2$ with the sign given by the sign of the RHS of equation (5), and $|V|$ is given by equation 5, and if neither RHS's are zero, then $$\Theta = \text{Arctan} \sqrt{3} \left[ \frac{L_2(w_3^* + w_1^*) - w_2^*(L_3 + L_1)}{-w_1^*(2L_3 + L_2) + w_2^*(L_1 - L_3) + w_3^*(2L_1 + L_2)} \right], \text{modulo } \pi, \quad (7)$$

with $\Theta$ determined by the sign of the RHS of equation (5), and $|V|$ given by equation (5) or (6).

10. A rolling assembly comprising:
a platform having an upper surface and a lower surface;
three ball wheel assemblies mounted on the lower surface of the platform, each having a pair of ball wheels operatively coupled to a drive motor;
control means, coupled to the drive motors, for causing the drive motors to impart omni-directional, holonomic motion in the platform with fully decoupled and independently controllable translational and rotational movements,
the motion of the platform being defined by three kinmatic equations having a plurality of directional variables; and
movement command input means, for inputting at least three of the directional variable to thereby provide platform motion vectors based on the kinematic equations.

11. A rolling assembly according to claim 10, wherein each wheel assembly includes a support connected to the lower surface of the platform, a cage rotatably mounted on the support and having a longitudinal rotation axis, a first ball wheel rotatably mounted in the cage and having a rotation axis orthogonal to the rotation axis of the cage, and a second ball wheel rotatably mounted in the cage and having a rotation axis orthogonal to the rotation axis or the cage and to the rotation axis of the first ball wheel.

12. A rolling assembly according to claim 11, wherein the support ball wheel assembly includes a frame having first and second parallel opposite end plates extending radially outwardly from a base plate, and a drive shaft journalled in the first and second end plates for rotation about the longitudinal rotation axis of the cage.

13. A rolling assembly according to claim 12, wherein each corresponding drive motor is mounted on the support for rotating the corresponding cage and thus the corresponding first and second ball wheels about a longitudinal axis of the corresponding cage.

14. A rolling assembly according to claim 13, wherein each ball wheel of each ball wheel assembly has a spherical surface and two flat sides, whereby as the drive shaft rotates, one spherical surface of either the first and second ball wheels is always in contact with the ground.

15. A rolling assembly according to claim 10, wherein the three ball wheel assemblies extend radially outwardly from a center of the platform at 120° to each other.

16. A rolling assembly according to claim 15, wherein the control means includes means for computing the drive shaft velocities for each respective drive motor according to the following equations:

$$\omega 1 = |V|/2R (\sin \Theta - \sqrt{3} \cos \Theta) + \psi L1/R \quad (1)$$

$$\omega 2 = -|V|/R \sin \Theta + \psi L2/R \quad (2)$$

$$\omega 3 = |V|/2R (\sin \Theta + \sqrt{3} \cos \Theta) + \psi L3/R \quad (3)$$

where R is the radius of the ball wheels and Li represents the distance between the center of the platform and the center of the wheel of the assembly "i" currently contacting the ground, $\Psi$ denotes the angular velocity of an internal reference frame of the platform with respect to an absolute reference from (x,y), the magnitude of the platform translational velocity is denoted by $|V|$ and its direction with respect to the platform internal reference frame is denoted by $\Theta$.

17. A rolling assembly according to claim 16, further comprising a feed back loop associated with each control signal, and including a tachometer associated with each drive motor and providing actual driving velocity data to the computing means.

18. A rolling assembly according to claim 17, further comprising photosensor means associated with each ball wheel assembly for providing ground contact data to the computing means.

19. A rolling assembly according to claim 18, wherein the movement command input means for provides platform steering input data to the computing means.

20. A rolling assembly according to claim 19, wherein the movement command input means comprises a joystick, and the directional variables are $|V|\sin\theta$, $|V|\cos\theta$, and $\psi$, where $\psi$ is angular velocity, $\theta$ is the direction of the platform, and V is the magnitude of translational velocity of the platform.

21. An apparatus for controlling a rolling platform having at least three ball wheel assemblies, each assembly having two ball wheels driven by a drive shaft of a drive motor, the apparatus comprising:
   means for outputting a drive signal indicative of a desired shaft velocity to each drive motor necessary to impart a desired motion in the platform;
   means for estimating the current orientation and position of the platform using data on the timing of contact with the ground switches from one wheel to the other for each wheel assembly; and
   means for correcting the drive signal to account for differences between the desired motion and the estimated current orientation and position of the platform.

22. An apparatus according to claim 21, wherein the outputting means is a computer including means for determining shaft velocity for each drive motor according to the following equations:

$$\omega_1 = |V|/2R (\sin\Theta - \sqrt{3}\cos\Theta) + \psi L_1/R \quad (1)$$

$$\omega_2 = -|V|/R \sin\Theta + \psi L_2/R \quad (2)$$

$$\omega_3 = |V|/2R (\sin\Theta + \sqrt{3}\cos\Theta) + \psi L_3/R \quad (3)$$

where R is the radius of the ball wheels and $L_i$ represents the distance between the center of the platform and the center of the wheel of the assembly "i" currently contacting the ground, and $\psi$ denotes the angular velocity of an internal reference frame of the platform with respect to an absolute reference from (x,y).

23. An apparatus according to claim 22, wherein the estimating means comprises means or integrating the rotational and translational velocities with the values of the shaft velocities fed back during a loop cycle according to the following formula:

$$\frac{\Delta\psi}{\Delta t} \approx \psi = \frac{R(\omega^*_1 + \omega^*_2 + \omega^*_3)}{L_1 + L_2 + L_3} \quad (4)$$

$$|V|\sin\Theta = R\left[\frac{(\omega^*_1 + \omega^*_3)L_2 - \omega^*_2(L_1 + L_3)}{(L_1 + L_2 + L_3)}\right] \quad (5)$$

$$|V|\cos\Theta = \quad (6)$$

$$\frac{R}{\sqrt{3}}\left[\frac{-\omega^*_1(2L_3 + L_2) + \omega^*_2(L_1 - L_3) + \omega^*_3(2L_1 + L_2)}{L_1 + L_2 + L_3}\right]$$

wherein if both right-hand-sides of equations (5) and (6) are zero, then $|V|=0$ and $\Theta$ kept at its value from the previous loop cycle.

* * * * *